United States Patent [19]

Berger et al.

[11] 3,995,084

[45] Nov. 30, 1976

[54] FILMS AND BAGS OF NYLON 6 - NYLON 6,6 BLENDS

[75] Inventors: Paul W. Berger, Pine Grove; Philip S. Bollen, Auburn, both of Pa.

[73] Assignee: Allied Chemical Corporation, Morris Township, N.J.

[22] Filed: Feb. 26, 1975

[21] Appl. No.: 553,195

Related U.S. Application Data

[62] Division of Ser. No. 377,695, July 9, 1973, abandoned.

[52] U.S. Cl. ............................. 428/35; 229/3.5 R; 260/857 TW; 260/45.75 C; 426/412; 426/415; 428/220; 428/332; 428/474; 428/500; 264/216
[51] Int. Cl.² ............... B65D 79/00; B65D 85/72
[58] Field of Search ........... 260/857 TW, 45.75 C; 229/3.5 MF, 53, 3.5 R; 426/412, 415, 106, 410; 428/332, 500, 35, 474, 220

[56] References Cited
UNITED STATES PATENTS

| | | | |
|---|---|---|---|
| 2,193,529 | 3/1940 | Coffman | 260/857 TW |
| 2,852,485 | 9/1958 | Stott | 260/857 TW |
| 3,491,042 | 1/1970 | Hermann | 260/45.75 C |
| 3,519,595 | 7/1970 | Hermann | 260/45.75 C |
| 3,750,873 | 8/1973 | Roman | 229/3.5 MF |
| 3,776,798 | 1/1972 | Milano | 229/3.5 MF |

FOREIGN PATENTS OR APPLICATIONS

| | | | |
|---|---|---|---|
| 636,072 | 2/1962 | Canada | 260/857 TW |
| 750,973 | 1/1967 | Canada | 260/857 TW |

OTHER PUBLICATIONS

*Modern Plastics Encyclopedia,* 41(7A), July 1968, pp. 162, 163 and 181.

*Primary Examiner*—George F. Lesmes
*Assistant Examiner*—Ellis P. Robinson
*Attorney, Agent, or Firm*—Roger H. Criss; Patrick L. Henry

[57] ABSTRACT

In accordance with the present invention, films of a nylon 6-nylon 6,6 blend are produced by a process which comprises blending about 50 to about 80 percent by weight nylon 6 resin and correspondingly about 50 to about 20 percent by weight nylon 6,6 resin, extruding said blend at a temperature above its melting point onto a smooth moving support to form a coherent film; maintaining said support at a surface temperature in the range of about 230° to about 300° F. and collecting the resultant film. The resultant film has a haze value, as hereinafter defined, in the range of about 5 to about 20 percent, preferably about 8 to about 14 percent. Film having the latter range of haze values is particularly suitable for the production of cooking bags.

3 Claims, No Drawings

FILMS AND BAGS OF NYLON 6 - NYLON 6,6 BLENDS

This is a division of application Ser. No. 377,695, filed July 9, 1973, now abandoned.

BACKGROUND OF THE INVENTION

1. Field of the Invention

This invention relates to a process for producing a blended film comrising nylon 6 and nylon 6,6.

2. Description of the Prior Art

It has long been recognized that physical blends of nylon 6 and nylon 6,6 resins may be formed into films. For example, U.S. Pat. No. 2,193,529 to Coffman, issued in 1940, discloses such blends. It has recently been discovered that films made from such blends containing at least about 50 percent by weight nylon 6 are particularly suitable for use in forming cooking bags. However, to our knowledge, prior to the present invention, an efficient and reliable process for producing such blended films having a homogeneous appearance, uniform and controllable optical properties and good slip properties has not been known.

SUMMARY OF THE INVENTION

In accordance with the present invention, films of a nylon 6-nylon 6,6 blend are produced by a process which comprises blending about 50 to about 80 percent by weight nylon 6 resin and correspondingly about 50 to about 20 percent by weight nylon 6,6 resin, extruding said blend at a temperature above its melting point onto a smooth moving support to form a coherent film; maintaining said support at a surface temperature in the range of about 230° to about 300° F. and collecting the resultant film. The resultant film has a haze value, as hereinafter defined, in the range of about 5 to about 20 percent, preferably about 8 to about 14 percent. Film having the latter range of haze values is particularly suitable for the production of cooking bags.

DESCRIPTION OF THE PREFERRED EMBODIMENT

The physical blend of resins from which film is made in accordance with this invention comprises nylon 6 resin (polyepsilon caprolactam) and nylon 6,6 resin (polyhexamethylene adipamide). Preparation of these well-known polyamides is well understood by those skilled in the art and they may, for example, be prepared, respectively, from the intramolecular polymerization of the lactam of epsilon-aminocaproic acid and the condensation of hexamethylenediamine and adipic acid. The nylon 6 and nylon 6,6 resins useful herein preferably have a viscosity average molecular weight of at least about 10,000, preferably between about 15,000 and about 40,000.

The resins are intermixed to provide a blend comprising about 50 to about 80 weight percent nylon 6 resin and correspondingly about 50 to about 20 weight percent nylon 6,6 resin; preferably, the blend comprises about 60 to about 70 weight percent nylon 6 and correspondingly about 40 to about 30 weight percent nylon 6,6. Blending may be accomplished by any suitable means and although not required, the preparation of a homogeneous blend is definitely desirable. It is particularly preferred to blend the two resins at approximately room temperature, although the resins may alternatively be blended at elevated temperatures.

The blend is thereafter fed to an extrusion apparatus to extrude the blend at a temperature generally above its melting point. Any standard extrusion apparatus may be employed for this purpose and as such are well known, they are not specifically described herein. In an alternate embodiment, the two resins may be fed unmixed to an extrusion apparatus and mixing be performed in the extruder. In such case, the extruder suitably is provided with a mixing section or sections in its screw. Extrusion is preferably conducted at a temperature of about 15° F. to about 200° F. above the melting point of the blend. Since the two resins have different melting points, it will be understood by those skilled in the art that the melting point of a particular blend depends upon the relative amounts of each component resin. For example, a blend of about 50 percent nylon 6 and 50 percent nylon 6,6, by weight, has a melting point in the range of about 242° to 245° C., whereas a blend of about 75 percent nylon 6 and 25 percent nylon 6,6, by weight, has a melting point in the range of about 217° to 220° C. The melting point of any particular blend can obviously be determined.

The blended resin is extruded onto a smooth moving support or casting surface to form a coherent film. The rate of extrusion, the width of the extruder die orifice and the speed of the moving support may be varied widely and determine the thickness of the film. A casting drum, roll or continuous belt or similar means may be employed to serve as support. The preferred support is a casting roll, also known in the art as a chilled roll. Preferably, the rotating casting roll has a polytetrafluoroethylene-impregnated chromium surface to provide desired release and anti-stick properties although it is understood that other surfaced rolls may be employed.

In accordance with the invention, the surface temperature of the casting roll is maintained in the range of about 230° to about 300° F., preferably in the range of about 240° to about 280° F., and more preferably in the range of 240° to 260° F. The casting roll may be provided with any conventional means of maintaining the desired temperature.

After passing about the casting roll, the film is wound and collected on suitable collecting means, such as a drum or roll. Additional moving supports, such as rolls, may be employed for controlled cooling of the film as is known in the art. For example, a three roll system can be employed, with the casting roll being the first roll. In this embodiment, the second roll (cooling roll) may be maintained at a surface temperature of about 215° to about 245° F. and the third roll (heat set roll) may be maintained at the same temperature or higher. The temperatures of such rolls may be varied to control the cooling of the film as desired. As is conventional, the edges of the film may be slit to remove any distorted portions prior to winding.

Film may be produced according to this invention at any convenient lineal speed, such as about 30 to about 350 feet per minute and the film may be of any desired thickness, the preferred thickness being in the range of about 0.5 to about 2 mils. Conventional gauge monitoring systems may be employed to provide uniform thickness of the film.

The film may additionally comprise conventional additives such as heat stabilizers, fillers, lubricants, etc. It is preferred that the film include a heat stabilizer for the nylon 6,6 resin and a combination of cuprous iodide and cuprous bromide may be employed for this purpose. The total amount of heat stabilizer may vary but desirably is below about 200 parts per million parts of nylon 6,6 resin.

The film produced in accordance with the process of this invention has a haze value, as determined by ASTM D-1003 of about 5 to about 20 percent, preferably about 8 to about 14 percent. Film of the latter haze range is especially suitable for use in the production of cooking bags, since the film has the requisite clarity to be appealing to the consumer, the requisite blocking properties to prevent wrinkling when advanced in a bag making machine and the requisite slip properties to be readily openable for filling purposes. Furthermore, the film can be easily heat sealed and thermoformed. Film having a haze value in the range of about 8 to about 14 percent may be prepared by maintaining the surface temperature of the casting roll in the range of about 240° to 280° F.

The following examples illustrate specific applications of the above-described process. It is to be understood that the examples are for the purpose of illustration only and that the invention is not to be regarded as limited in any manner to the specific conditions or apparatus cited therein.

EXAMPLE 1

A blend of 65 weight percent nylon 6 (viscosity average molecular weight of 25,000) and 35 weight percent nylon 6,6 (relative viscosity of 150 cps) * is prepared by intimately mixing the resins in a drum tumbler at room temperature for 30 minutes. The blend is fed into a standard screw extruder and is extruded at a temperature of 534° F. through a die orifice of 0.018 inch thickness. The molten resin blend is quenched to a coherent film by being drawn downward onto a rotating 18 inch diameter chromium plated steel drum having a polytetrafluoroethylene-impregnated surface. The surface of the drum is maintained at 230° F. The die orifice is located approximately ¼ inch above the rotating drum. The drum is rotated at a peripheral speed sufficient to draw the melt to a thickness of 1 mil. The film is then passed about a cooling roll maintained at a surface temperature of 236°–240° F., then about a heat set roll maintained at a surface temperature of 275°–278° F and is then wound up. The extrusion rate and roll speeds are such that 204–208 pounds of film are produced per hour. The film has a haze of 7.9% as measured by the ASTM-D-1003 haze test. The film is used in the manufacture of cooking bags.

*measured in formic acid

EXAMPLE 2

Example 1 is repeated using different casting roll temperatures. The results are shown in Table 1.

TABLE 1

| Sample | Casting Roll Temperature ° F. | Haze [1] Percent |
|---|---|---|
| 1 | 230 | 7.9 |
| 2 | 240 | 8.1 |
| 3 | 250 | 8.5 |
| 4 | 260 | 9.9 |
| 5 | 270 | 11.4 |
| 6 | 280 | 14.4 |
| 7 | 290 | 17.0 |
| 8 | 300 | 19.4 |

[1]=determined by ASTM D-1003

EXAMPLE 3

Film produced in accordance with a process similar to Example 1 and having certain haze values are tested for their slip properties in accordance with ASTM D-1894-61T. The results are shown in Table 2.

TABLE 2

| Sample | Haze[1], % | Slip[2], grams | |
|---|---|---|---|
| | | Static | Kinetic |
| 9 | 5.3 | 225 | 148 |
| 10 | 9.3 | 190 | 122 |
| 11 | 11.7 | 194 | 127 |
| 12 | 14.6 | 154 | 116 |

[1]=determined by ASTM D-1003
[2]=determined by ASTM D-1894-61T

As mentioned above, the film in this invention is particularly suited for forming cooking bags. It should be understood that the film may also be used for a variety of other purposes, such as in the packaging and fabricating fields, for example, as wrapping of food, paper cartons, chemicals, etc. The film may also be laminated to other plastics (such as polyolefins) for easy sealing.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:

1. A cooking bag formed from a film comprising a blend of about 50 to about 80 weight percent nylon 6 resin and correspondingly about 50 to about 20 weight percent nylon 6,6 resin and having a haze value, as determined by ASTM D-1003, of about 8 to about 14 percent and a heat stabilizer comprising cuprous iodide and cuprous bromide.

2. A film in accordance with claim 1 wherein said blend comprises about 60 to about 70 weight percent nylon 6 and correspondingly about 40 to about 30 weight percent nylon 6,6.

3. A film in accordance with claim 2 having a thickness of about 0.5 to about 2 mils.

* * * * *